(12) United States Patent
Kim et al.

(10) Patent No.: US 12,013,020 B2
(45) Date of Patent: Jun. 18, 2024

(54) TORQUE VECTORING DEVICE FOR A VEHICLE

(71) Applicants: HYUNDAI MOTOR COMPANY, Seoul (KR); KIA CORPORATION, Seoul (KR)

(72) Inventors: Dae Young Kim, Hwaseong-si (KR); Kwang Min Choi, Seoul (KR); Baek Yu Kim, Hwaseong-si (KR); Chul Min Ahn, Anyang-si (KR); Sung Gon Byun, Hwaseong-si (KR); Sun Sung Kwon, Anyang-si (KR); Jun Hoi Huh, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/140,422

(22) Filed: Apr. 27, 2023

(65) Prior Publication Data

US 2024/0151300 A1    May 9, 2024

(30) Foreign Application Priority Data

Nov. 9, 2022  (KR) .................. 10-2022-0148985

(51) Int. Cl.
*F16H 48/08*  (2006.01)
*F16H 48/24*  (2006.01)
*F16H 48/36*  (2012.01)

(52) U.S. Cl.
CPC ............. *F16H 48/08* (2013.01); *F16H 48/24* (2013.01); *F16H 2048/364* (2013.01); *F16H 2048/368* (2013.01)

(58) Field of Classification Search
CPC .... F16H 48/08–2048/087; F16H 48/24; F16H 48/36; F16H 2048/364–368; F16D 2011/004
See application file for complete search history.

(56) References Cited

U.S. PATENT DOCUMENTS

| | | | | |
|---|---|---|---|---|
| 4,328,717 A | * | 5/1982 | Arai ....................... | F16H 3/663 475/121 |
| 4,706,518 A | * | 11/1987 | Moroto ................. | F16H 37/022 475/210 |
| 10,801,598 B2 | * | 10/2020 | Sullivan ............. | B60K 23/0808 |
| 10,995,840 B2 | * | 5/2021 | Pinschmidt ............ | B60K 6/365 |

(Continued)

FOREIGN PATENT DOCUMENTS

| DE | 102013214095 A1 * | 1/2015 | ............... B60K 1/00 |
|---|---|---|---|
| KR | 20210089817 A | 7/2021 | |

*Primary Examiner* — Ernesto A Suarez
*Assistant Examiner* — James J Taylor, II
(74) *Attorney, Agent, or Firm* — Lempia Summerfield Katz LLC (57) ABSTRACT

A torque vectoring device for a vehicle is disclosed. The torque vectoring device includes: a differential; a first planetary gear set connected, at a first rotating element thereof, to a differential case of the differential; a second planetary gear set connected, at a first rotating element thereof, to a selected drive shaft that is one of two drive shafts coupled to the differential; a motor connected to a second rotating element of the first planetary gear set; and a selective fixing mechanism configured to selectively fix a second rotating element or a third rotating element of the second planetary gear set.

12 Claims, 9 Drawing Sheets

(56) References Cited

U.S. PATENT DOCUMENTS

| | | |
|---|---|---|
| 11,035,451 B1 | 6/2021 | Ahn et al. |
| 11,420,511 B2 * | 8/2022 | Pinschmidt ............ B60K 6/365 |
| 2021/0207698 A1 | 7/2021 | Ahn et al. |

* cited by examiner

TORQUE VECTORING DEVICE FOR A VEHICLE

CROSS-REFERENCE TO RELATED APPLICATION

This application claims priority to and the benefit of Korean Patent Application No. 10-2022-0148985, filed on Nov. 9, 2022, in the Korean Intellectual Property Office, the disclosure of which is incorporated herein by reference.

BACKGROUND

1. Technical Field

The present disclosure relates to technology for realizing torque vectoring of a vehicle.

2. Description of the Related Art

In a vehicle, a speed difference between an inner wheel and an outer wheel should be allowed because the vehicle not only performs straight driving, but also performs turning driving according to steering. In particular, the vehicle employs a differential for drive wheels in order to allow a speed difference between left and right drive wheels.

The differential is a passive device configured to mechanically allow a speed difference between left and right drive wheels of a vehicle in accordance with a difference of resistances generated at the left and right drive wheels during turning of the vehicle. Although the differential may have an advantage in that easy turning of the vehicle is achieved, the differential may have a disadvantage in that the vehicle has difficulty escaping from a rough road or the like on which a considerable frictional force difference between the left and right drive wheels on a road surface is generated.

In order to overcome the above-mentioned disadvantage, a limited slip differential configured to limit a differential function of the differential has been employed. Recently, torque vectoring technology for actively adjusting torques provided to left and right drive wheels of a vehicle in accordance with a driving situation of the vehicle, thereby further enhancing driving performance of the vehicle, has been developed.

The above matters disclosed in this section are merely for enhancement of understanding of the general background of the disclosure and should not be taken as an acknowledgement or any form of suggestion that the matters form the related art already known to a person having ordinary skill in the art.

SUMMARY

Therefore, the present disclosure has been made in view of the above problems, and it is an object of the present disclosure to provide a torque vectoring device for a vehicle capable of controlling torque vectoring of opposite drive wheels through a relatively simple configuration, thereby achieving an enhancement in driving performance of the vehicle and, as such, achieving an enhancement in marketability of the vehicle.

In accordance with an aspect of the present disclosure, the above and other objects can be accomplished by the provision of a torque vectoring device for a vehicle including: a differential; a first planetary gear set connected, at a first rotating element thereof, to a differential case of the differential; a second planetary gear set connected, at a first rotating element thereof, to a selected drive shaft that is one of two drive shafts coupled to the differential; a motor connected to a second rotating element of the first planetary gear set; and a selective fixing mechanism configured to selectively fix a second rotating element or a third rotating element of the second planetary gear set, wherein one of the second rotating element and the third rotating element of the second planetary gear set is directly connected to a third rotating element of the first planetary gear set.

The third rotating element of the second planetary gear set may be directly connected to the third rotating element of the first planetary gear set.

In the first planetary gear set, the first rotating element thereof may be a first carrier, the second rotating element thereof may be a first sun gear, and the third rotating element thereof may be a first ring gear. In the second planetary gear set, the first rotating element thereof may be a second carrier, the second rotating element thereof may be a second sun gear, and the third rotating element thereof may be a second ring gear.

The first planetary gear set and the second planetary gear set may be disposed at opposite sides of the differential, respectively, under a condition that the differential is interposed therebetween. The selected drive shaft may be a drive shaft disposed at the side of the differential where the second planetary gear set is disposed.

The selective fixing mechanism may include: a fixed gear fixed to a transmission case; a first clutch gear connected to the second rotating element of the second planetary gear set; a second clutch gear connected to the third rotating element of the second planetary gear set; and a sleeve configured to be switched, in accordance with axial linear sliding thereof, between a state of interconnecting the fixed gear and the first clutch gear and a state of interconnecting the fixed gear and the second clutch gear.

An input gear may be connected to the second rotating element of the first planetary gear set. A drive gear engaged with the input gear may be connected to a rotating shaft of the motor.

The second rotating element of the first planetary gear set may be connected to the motor via a third planetary gear set configured to transmit power of the motor in a speed-reduced state.

The motor may be connected to a third sun gear of the third planetary gear set, to supply power thereto. A third ring gear of the third planetary gear set may be fixed to the transmission case. A third carrier of the third planetary gear set may be directly connected to the second rotating element of the first planetary gear set.

In accordance with another aspect of the present disclosure, there is provided a torque vectoring device for a vehicle including: a differential; a first planetary gear set including one rotating element connected to a motor to receive power from the motor, another rotating element connected to a differential case of the differential, and another remaining rotating element connected to a connecting member; a second planetary gear set including one rotating element connected to a selected drive shaft that is one of two drive shafts coupled to opposite sides of the differential, another rotating element connected to a first clutch gear, and another remaining rotating element connected to a second clutch gear and the connecting member; and a selective fixing mechanism configured to fix the first clutch gear or the second clutch gear.

The selective fixing mechanism may include a fixed gear fixed to a transmission case, and a sleeve configured to slide axially in a state engaged with the fixed gear and to be switched between a state engaged with the first clutch gear and a state engaged with the second clutch gear in accordance with the axial linear sliding.

In the first planetary gear set, a first sun gear thereof may be connected to the motor to receive power from the motor, a first carrier thereof may be connected to the differential case of the differential, and a first ring gear thereof may be connected to the connecting member. In the second planetary gear set, a second carrier thereof may be connected to the selected drive shaft, a second sun gear thereof may be connected to the first clutch gear, and a second ring gear thereof may be connected to the second clutch gear and the connecting member.

The first planetary gear set may be disposed at one of the sides of the differential. The second planetary gear set and the selected drive shaft may be disposed at the other (another) of the sides of the differential. The connecting member may be installed to interconnect the first ring gear and the second ring gear outside of the differential.

The motor may be connected to the first sun gear in an external engagement manner.

The motor may be connected to the first sun gear to transmit power to the first sun gear in a state of being reduced in speed using a third planetary gear set.

BRIEF DESCRIPTION OF THE DRAWINGS

The above and other objects, features and other advantages of the present disclosure is more clearly understood from the following detailed description taken in conjunction with the accompanying drawings, in which.

DETAILED DESCRIPTION

Hereinafter, embodiments of the present disclosure are described in detail with reference to the accompanying drawings, and the same or similar elements are designated by the same reference numerals regardless of the numerals in the drawings and redundant description thereof have been omitted.

The suffixes "module" and "unit" of elements herein are used for convenience of description and thus can be used interchangeably and do not have any distinguishable meanings or functions.

In describing the present disclosure, moreover, a detailed description has been omitted when a specific description of publicly known technologies to which the disclosure pertains is judged to obscure the gist of the present disclosure. In addition, it should be noted that the accompanying drawings are merely illustrated to easily explain the spirit of the disclosure, and therefore, should not be construed as limiting the spirit of the disclosure to the accompanying drawings. On the contrary, the disclosure is to cover all modifications, equivalents, and alternatives falling within the spirit and scope of the disclosure as defined by the claims.

Although terms including an ordinal number, such as first or second, may be used to describe a variety of constituent elements, the constituent elements are not limited to the terms, and the terms are used only for the purpose of discriminating one constituent element from other constituent elements.

It is understood that, when one element is referred to as being "connected to" or "coupled to" another element, the one element may be "connected to" or "coupled to" another element via a further element although the one element may be directly connected to or directly coupled to another element. On the other hand, it is understood that, when an element is referred to as being "directly connected to" or "directly coupled to" another element, there is no intervening element present.

As used in the description of the disclosure and the appended claims, the singular forms are intended to include the plural forms as well, unless context clearly indicates otherwise.

It is further understood that the terms "comprises" and/or "comprising," or "includes" and/or "including" when used in this specification, specify the presence of stated features, regions, integers, steps, operations, elements, and/or combinations thereof, but do not preclude the presence or addition of one or more other features, regions, integers, steps, operations, elements, components, and/or combinations thereof.

In addition, the term "unit" or "control unit" used in specific terms such as a motor control unit (MCU), a hybrid control unit (HCU), or the like is only a term widely used for designation of a controller for controlling a particular function of a vehicle and, as such, does not mean a generic functional unit.

The controller may include a communication device configured to communicate with another controller or a sensor, for control of a function to be performed thereby, a memory configured to store an operating system, logic commands, input/output information, and the like, and at least one processor configured to execute discrimination, calculation, determination, and the like required for control of the function to be performed.

Referring to FIGS. 1-6, a torque vectoring device 1 for a vehicle according to an embodiment of the present disclosure is shown. The torque vectoring device 1 is configured through inclusion of: a differential DF; a first planetary gear set PG1 connected, at a first rotating element E1 thereof, to a differential case DC of the differential DF; a second planetary gear set PG2 connected, at a first rotating element E1 thereof, to one of two drive shafts DS coupled to the differential DF, i.e., a selected drive shaft SDS; a motor M connected to a second rotating element E2 of the first planetary gear set PG1; and a selective fixing mechanism FX configured to selectively fix a second rotating element E2 or a third rotating element E3 of the second planetary gear set PG2.

In this case, one of the second rotating element E2 and the third rotating element E3 of the second planetary gear set PG2 is directly connected to a third rotating element E3 of the first planetary gear set PG1.

In other words, an operation mode of the torque vectoring device 1 is switched between a torque vectoring mode and a driving mode in accordance with which one of the second rotating element E2 and the third rotating element E3 of the second planetary gear set PG2 is fixed by the selective fixing mechanism FX. Power of the motor M may be transmitted to the differential case DC via the first planetary gear set PG1. Power of the motor M may also be directly transmitted to the selected drive shaft SDS via the second planetary gear set PG2.

The third rotating element E3 of the second planetary gear set PG2 is directly connected to the third rotating element E3 of the first planetary gear set PG1.

In the first planetary gear set PG1, the first rotating element E1 thereof is a first carrier C1, the second rotating element E2 thereof is a first sun gear S1, and the third rotating element E3 thereof is a first ring gear R1. In the second planetary gear set PG2, the first rotating element E1 thereof is a second carrier C2, the second rotating element E2 thereof is a second sun gear S2, and the third rotating element E3 thereof is a second ring gear R2.

Accordingly, the second ring gear R2 of the second planetary gear set PG2 is directly connected to the first ring gear R1 of the first planetary gear set PG1.

The first planetary gear set PG1 and the second planetary gear set PG2 are disposed at opposite sides of the differential DF, respectively, under the condition that the differential DF is interposed therebetween. The selected drive shaft SDS is a drive shaft DS disposed at the side of the differential DF where the second planetary gear set PG2 is disposed.

For reference, the term "selected drive shaft SDS" is used to distinguish the drive shaft DS connected to the second carrier C2 of the second planetary gear set PG2 from the drive shaft DS disposed at an opposite side (i.e., the side on which the first planetary gear set PG1 is disposed).

The selective fixing mechanism FX is configured through inclusion of a fixed gear FG fixed to a transmission case CS, a first clutch gear CG1 connected to the second rotating element E2 of the second planetary gear set PG2, a second clutch gear CG2 connected to the third rotating element E3 of the second planetary gear set PG2, and a sleeve SB configured to be switched, in accordance with axial linear sliding thereof, between a state of interconnecting the fixed gear FG and the first clutch gear CG1 and a state of interconnecting the fixed gear FG and the second clutch gear CG2.

Figure 1:
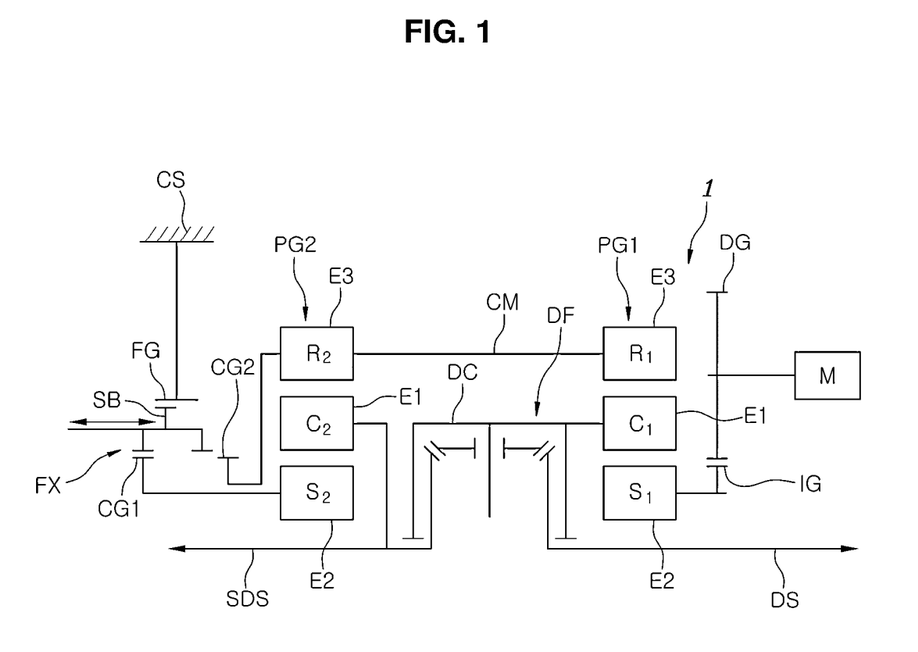
FIG. 1 is a diagram of a torque vectoring device for a vehicle according to an embodiment of the present disclosure, showing a torque vectoring mode.
Figure 4:
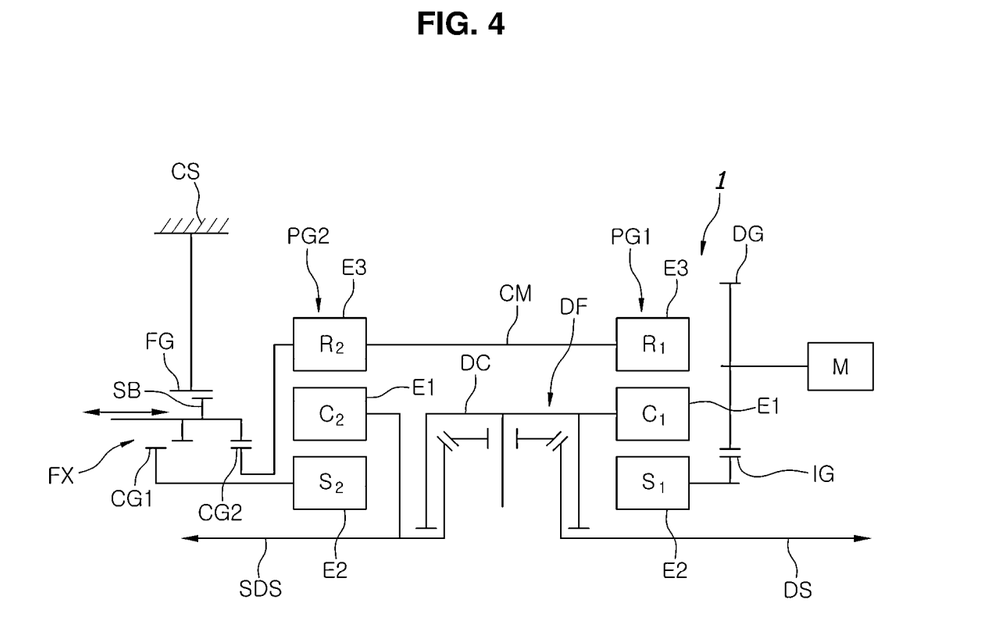
FIG. 4 is a diagram showing a state in which the torque vectoring device of FIG. 1 implements a driving mode.
Figure 5:
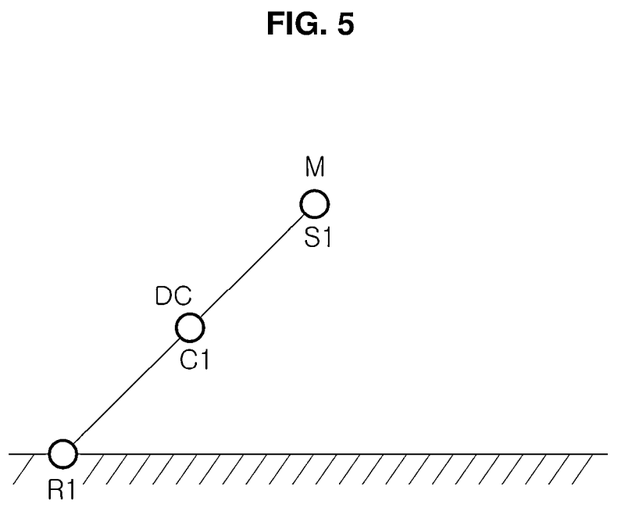
FIG. 5 is a lever diagram showing a state of FIG. 3.
Figure 6:
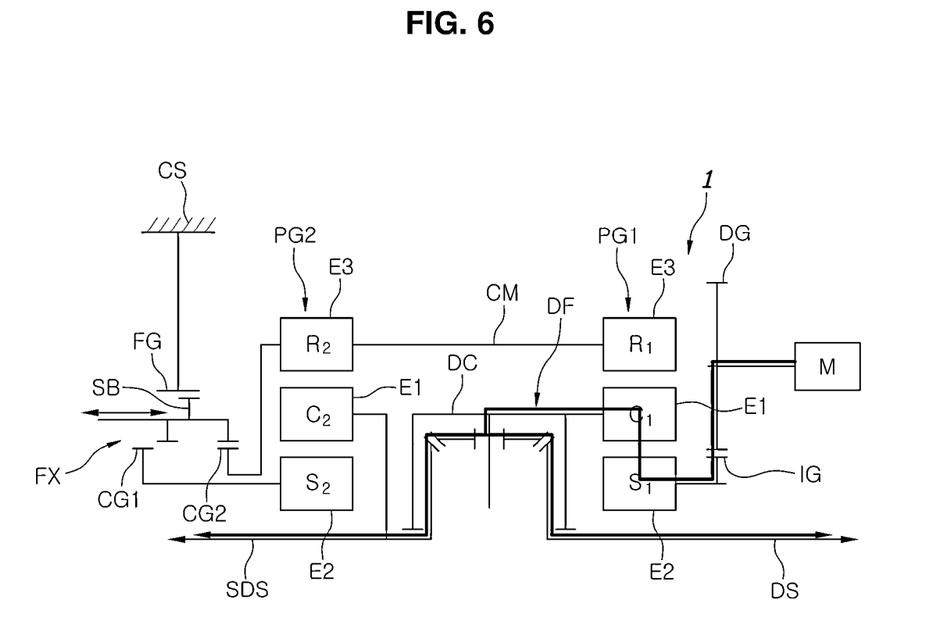
FIG. 6 is a diagram showing flow of power in the state of FIG. 4.

Accordingly, when the sleeve SB linearly slides in an axial direction, one of a state of FIG. 1 and a state of FIG. 4 may be selected.

In this example, the axial direction means a longitudinal direction of the drive shaft DS and rotating axis directions of the first planetary gear set PG1 and the second planetary gear set PG2.

Of course, a separate actuator and a separate controller may be connected to the sleeve SB in order to linearly slide the sleeve SB. In this case, as the controller drives the actuator in accordance with a driving situation of the vehicle, the sleeve SB is linearly slid and, as such, a mode suitable for the driving situation of the vehicle may be selected.

For reference, the sleeve SB, the first clutch gear CG1, and the second clutch gear CG2 may be configured using a conventional dog clutch configuration or may be configured using a configuration including a synchronizer ring and key such as a conventional synchromesh type device.

In an embodiment, an input gear IG is connected to the second rotating element E2 of the first planetary gear set PG1, and a drive gear DG, which is engaged with the input gear IG, is connected to a rotating shaft of the motor M such that the drive gear DG is externally engaged with the input gear IG.

Accordingly, power of the motor M is input to the first sun gear S1 via the drive gear DG and the input gear IG.

Figure 8:
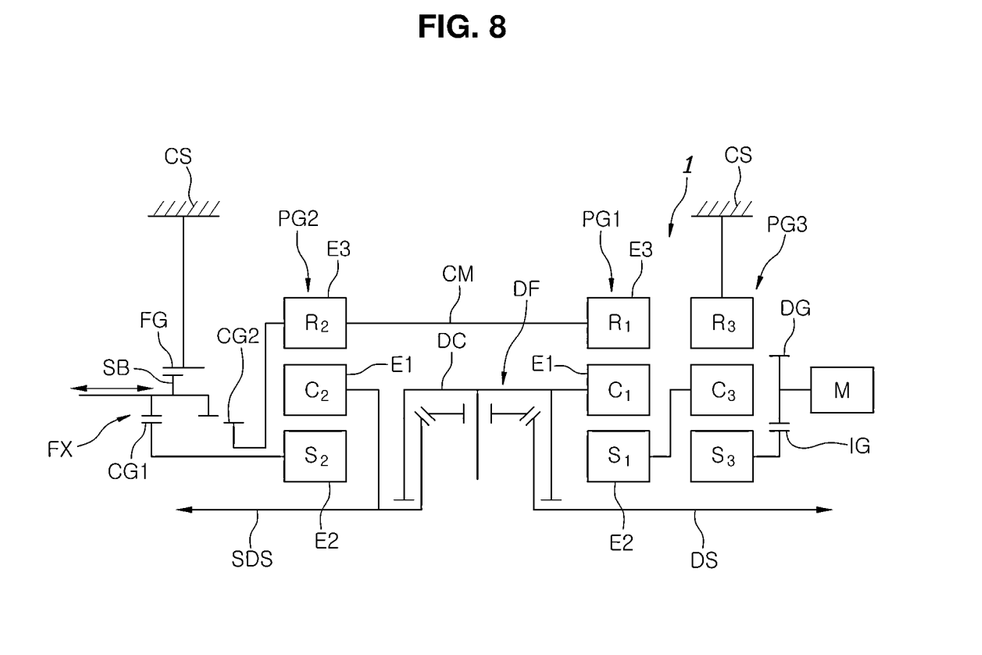
FIG. 8 is a diagram of a torque vectoring device for a vehicle according to a second embodiment of the present disclosure, showing a torque vectoring mode.
Figure 9:
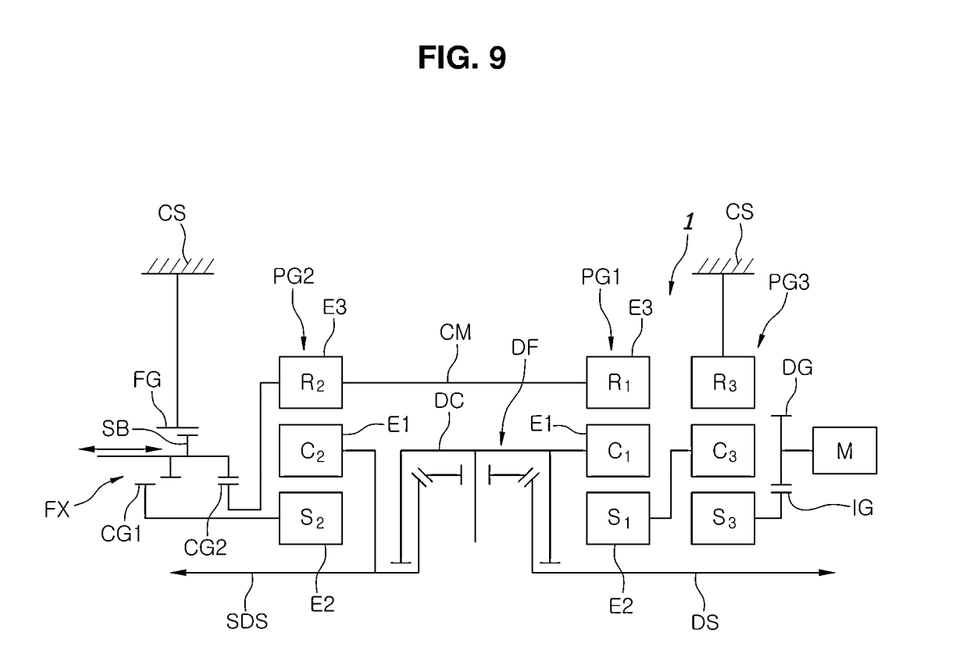
FIG. 9 is a diagram showing a state in which the torque vectoring device of FIG. 8 implements a driving mode.

Referring to FIGS. 8 and 9, a torque vectoring device for a vehicle according to a second embodiment of the present disclosure is shown. The second embodiment shown in FIGS. 8 and 9 has the same configuration as that of the embodiment of FIG. 1, except for a connection relation between the second rotating element E2 of the first planetary gear set PG1 and the motor M.

In other words, in the second embodiment of FIG. 8, the second rotating element E2 of the first planetary gear set PG1 is connected to the motor M via a third planetary gear set PG3 configured to transmit power of the motor M in a speed-reduced state.

In detail, the motor M is connected to a third sun gear S3 of the third planetary gear set PG3, to supply power thereto. A third ring gear R3 of the third planetary gear set PG3 is fixed to the transmission case CS. A third carrier C3 of the third planetary gear set PG3 is directly connected to the second rotating element E2 of the first planetary gear set PG1.

Accordingly, power of the motor M is input to the second rotating element E2 of the first planetary gear set PG1 after being reduced in speed through the third carrier C3.

Figure 7:
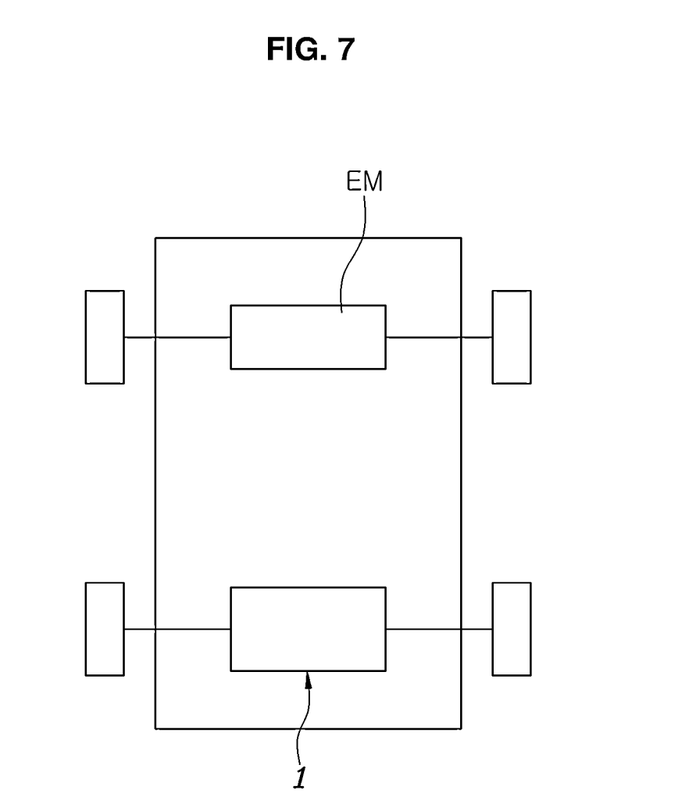
FIG. 7 is a view explaining a vehicle to which the present disclosure is applied.

FIG. 7 illustrates a vehicle in which the torque vectoring device 1 according to one of the embodiments of the present disclosure as described above is provided at ones of front and rear wheels of the vehicle, and a separate driving device is provided at the others of the front and rear wheels.

In other words, in the case of FIG. 7, the front wheels are configured to be driven by a driving device such as a separate electric motor EM or an engine, whereas the rear wheels are configured to be driven by the torque vectoring device 1 according to an embodiment of the present disclosure.

In this case, a driving mode according to an embodiment of the present disclosure may be used in order to assist in general driving of the vehicle or to drive the rear wheels through power of the motor M of the torque vectoring device 1 such that the vehicle may escape from a rough road when the front wheels have become stuck in the rough road.

In other words, as illustrated in FIGS. 3-6, when the second clutch gear CG2 is fixed, the first ring gear R1 is fixed together with the second ring gear R2. Accordingly, power input to the first sun gear S1 is input to the differential case DC after being reduced in speed by the first carrier C1. The selected drive shaft SDS and the second carrier C2 are rotated by power transmitted thereto from the differential case DC because the second sun gear S2 rotates freely. The other drive shaft DS is also rotated by power transmitted thereto from the differential case DC. Accordingly, the rear wheels are driven to move the vehicle such that the front wheels escape from the rough road.

Figure 2:
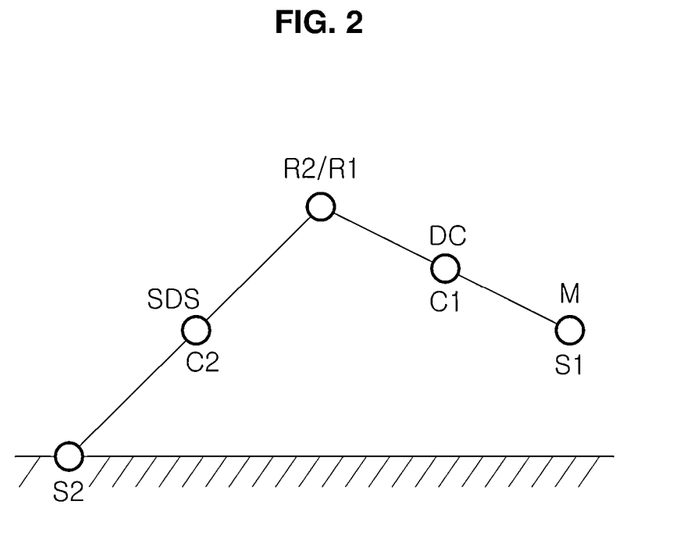
FIG. 2 is a lever diagram showing a state of FIG. 1.
Figure 3:
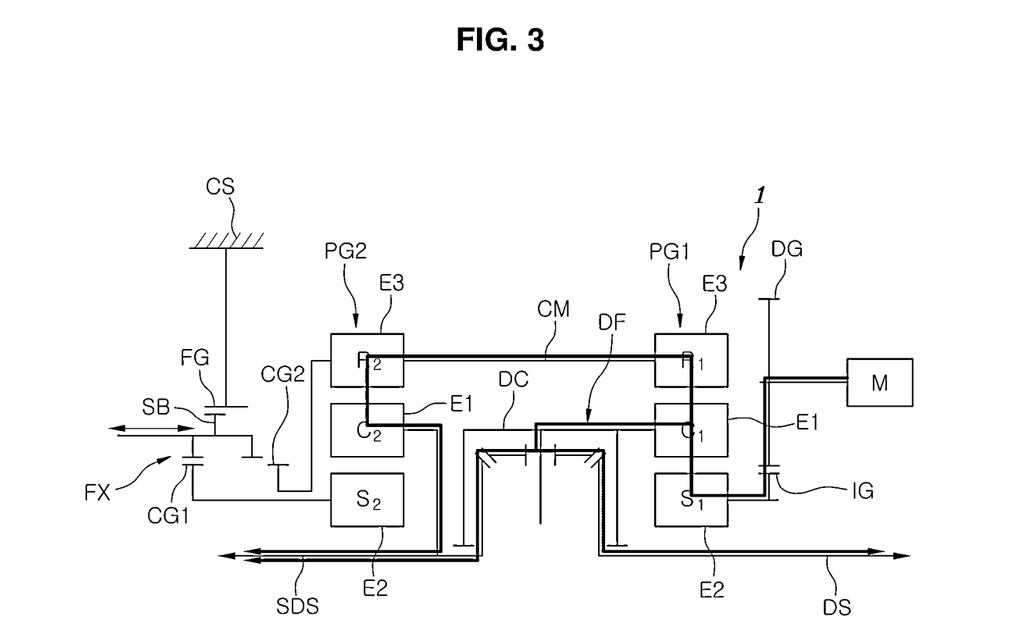
FIG. 3 is a diagram showing flow of power in the state of FIG. 1.

In the torque vectoring mode, the sleeve SB fixes the first clutch gear CG1. In this state, accordingly, power supplied from the motor M may adjust a speed difference between the first carrier C1 and the second carrier C2, as shown in FIG. 2.

Accordingly, it may be possible to actively establish driving states of the rear wheels suitable for a driving situation of the vehicle by adjusting speeds and torques of the differential case DC and the selected drive shaft SDS under control of the motor M.

Thus, driving performance of the vehicle may be enhanced and, as such marketability of the vehicle may be enhanced.

In accordance with another embodiment of the present disclosure, a torque vectoring device for a vehicle having the following configuration may be provided.

In other words, the torque vectoring device according to an embodiment is configured through inclusion of: a differential DF; a first planetary gear set PG1 including one rotating element connected to a motor M, to receive power from the motor M, another rotating element connected to a differential case DC of the differential DF, and another remaining rotating element connected to a connecting member CM; a second planetary gear set PG2 including one rotating element connected to a selected drive shaft SDS that is one of two drive shafts DS coupled to opposite sides of the differential DF, another rotating element connected to a first clutch gear CG1, and another remaining rotating element connected to a second clutch gear CG2 and the connecting member M; and a selective fixing mechanism FX configured to fix the first clutch gear CG1 or the second clutch gear CG2.

The selective fixing mechanism FX is configured through inclusion of a fixed gear FG fixed to a transmission case CS, and a sleeve SB configured to slide axially in a state engaged with the fixed gear FG and to be switched between a state engaged with the first clutch gear CG1 and a state engaged with the second clutch gear CG2 in accordance with the axial linear sliding.

In the first planetary gear set PG1, a first sun gear S1 thereof is connected to the motor M, to receive power from the motor M, a first carrier C1 thereof is connected to the differential case DC of the differential DF, and a first ring gear R1 thereof is connected to the connecting member CM.

In the second planetary gear set PG2, a second carrier C2 thereof is connected to the selected drive shaft SDS, a second sun gear S2 thereof is connected to the first clutch gear CG1, and a second ring gear R2 thereof is connected to the second clutch gear CG2 and the connecting member CM.

The first planetary gear set PG1 is disposed at one side of the differential DF. The second planetary gear set PG2 and the selected drive shaft SDS are disposed at the other side of the differential DF. The connecting member CM is installed to interconnect the first ring gear R1 and the second ring gear R2 at an outside of the differential DF.

In this case, the connecting member CM may be formed using a separate part, or may be configured through extension of the first ring gear R1 or the second ring gear R2 itself.

The motor M may be connected to the first sun gear S1 in an external engagement manner.

The motor M may be connected to the first sun gear S1 to transmit power to the first sun gear S1 in a state of being reduced in speed using a third planetary gear set PG3.

As apparent from the above description, in a torque vectoring device for a vehicle according to each of the embodiments of the present disclosure, it may be possible to control torque vectoring of opposite drive wheels through a relatively simple configuration, thereby achieving an enhancement in driving performance of the vehicle and, as such, achieving an enhancement in marketability of the vehicle.

Although the embodiments of the present disclosure have been disclosed for illustrative purposes, those having ordinary skill in the art will appreciate that various modifications, additions and substitutions are possible, without departing from the scope and spirit of the disclosure as disclosed in the accompanying claims.

What is claimed is:

1. A torque vectoring device for a vehicle, the torque vectoring device comprising:
   a differential;
   a first planetary gear set connected, at a first rotating element thereof, to a differential case of the differential;
   a second planetary gear set connected, at a first rotating element thereof, to a selected drive shaft that is one of two drive shafts coupled to the differential;
   a motor connected to a second rotating element of the first planetary gear set; and
   a selective fixing mechanism configured to selectively fix a second rotating element or a third rotating element of the second planetary gear set,
   wherein one of the second rotating element and the third rotating element of the second planetary gear set is directly connected to a third rotating element of the first planetary gear set,
   wherein the second rotating element of the first planetary gear set is connected to the motor via a third planetary gear set configured to transmit power of the motor in a speed-reduced state, and
   wherein:
   the motor is connected to a third sun gear of the third planetary gear set, to supply power thereto;
   a third ring gear of the third planetary gear set is fixed to a transmission case; and
   a third carrier of the third planetary gear set is directly connected to the second rotating element of the first planetary gear set.

2. The torque vectoring device according to claim 1, wherein the third rotating element of the second planetary gear set is directly connected to the third rotating element of the first planetary gear set.

3. The torque vectoring device according to claim 2, wherein:
   the first rotating element of the first planetary gear set is a first carrier, the second rotating element of the first planetary gear set is a first sun gear, and the third rotating element of the first planetary gear set is a first ring gear; and
   the first rotating element of the second planetary gear set is a second carrier, the second rotating element of the second planetary gear set is a second sun gear, and the third rotating element of the second planetary gear set is a second ring gear.

4. The torque vectoring device according to claim 2, wherein:
   the first planetary gear set and the second planetary gear set are disposed at opposite sides of the differential, respectively, wherein the differential is interposed therebetween; and
   the selected drive shaft is one of the two drive shafts disposed at one of the opposite sides of the differential where the second planetary gear set is disposed.

5. The torque vectoring device according to claim 1, wherein the selective fixing mechanism comprises:
   a fixed gear fixed to a transmission case;
   a first clutch gear connected to the second rotating element of the second planetary gear set;
   a second clutch gear connected to the third rotating element of the second planetary gear set; and
   a sleeve configured to be switched, in accordance with axial linear sliding thereof, between a state of interconnecting the fixed gear and the first clutch gear and a state of interconnecting the fixed gear and the second clutch gear.

6. The torque vectoring device according to claim 1, wherein:
   an input gear is connected to the second rotating element of the first planetary gear set; and
   a drive gear engaged with the input gear is connected to a rotating shaft of the motor.

7. A vehicle comprising:
   the torque vectoring device according to claim 1 provided at one of front and rear wheels of the vehicle; and
   a separate driving device provided at the other of the front and rear wheels.

8. A torque vectoring device for a vehicle, the torque vectoring device comprising:
   a differential;
   a first planetary gear set comprising a first rotating element connected to a motor to receive power from the motor, a second rotating element directly connected to a differential case of the differential, and a third rotating element connected to a connecting member;
   a second planetary gear set comprising a first rotating element directly connected to a selected drive shaft that is one of two drive shafts coupled to opposite sides of the differential, a second rotating element connected to a first clutch gear, and a third rotating element connected to a second clutch gear and the connecting member; and
   a selective fixing mechanism configured to fix the first clutch gear or the second clutch gear;
   wherein the selective fixing mechanism comprises:
   a fixed gear fixed to a transmission case; and
   a sleeve configured to slide axially in a state engaged with the fixed gear and to be switched between a state engaged with the first clutch gear and a state engaged with the second clutch gear in accordance with axial linear sliding.

9. The torque vectoring device according to claim 8, wherein:
   in the first planetary gear set, the first rotating element connected to the motor to receive power from the motor is a first sun gear, the second rotating element directly connected to the differential case of the differential is a first carrier, and the third rotating element connected to the connecting member is a first ring gear; and
   in the second planetary gear set, the first rotating element directly connected to the selected drive shaft is a second carrier, the second rotating element connected to the first clutch gear is a second sun gear, and the third rotating element connected to the second clutch gear and the connecting member is a second ring gear.

10. The torque vectoring device according to claim 9, wherein:
    the first planetary gear set is disposed at one side of the opposite sides of the differential;
    the second planetary gear set and the selected drive shaft are disposed at another side of the opposite sides of the differential; and
    the connecting member is installed to interconnect the first ring gear and the second ring gear outside of the differential.

11. The torque vectoring device according to claim 10, wherein the motor is connected to the first sun gear in an external engagement manner.

12. The torque vectoring device according to claim 10, wherein the motor is connected to the first sun gear to transmit power to the first sun gear in a state of being reduced in speed using a third planetary gear set.

\* \* \* \* \*